Figure 1:
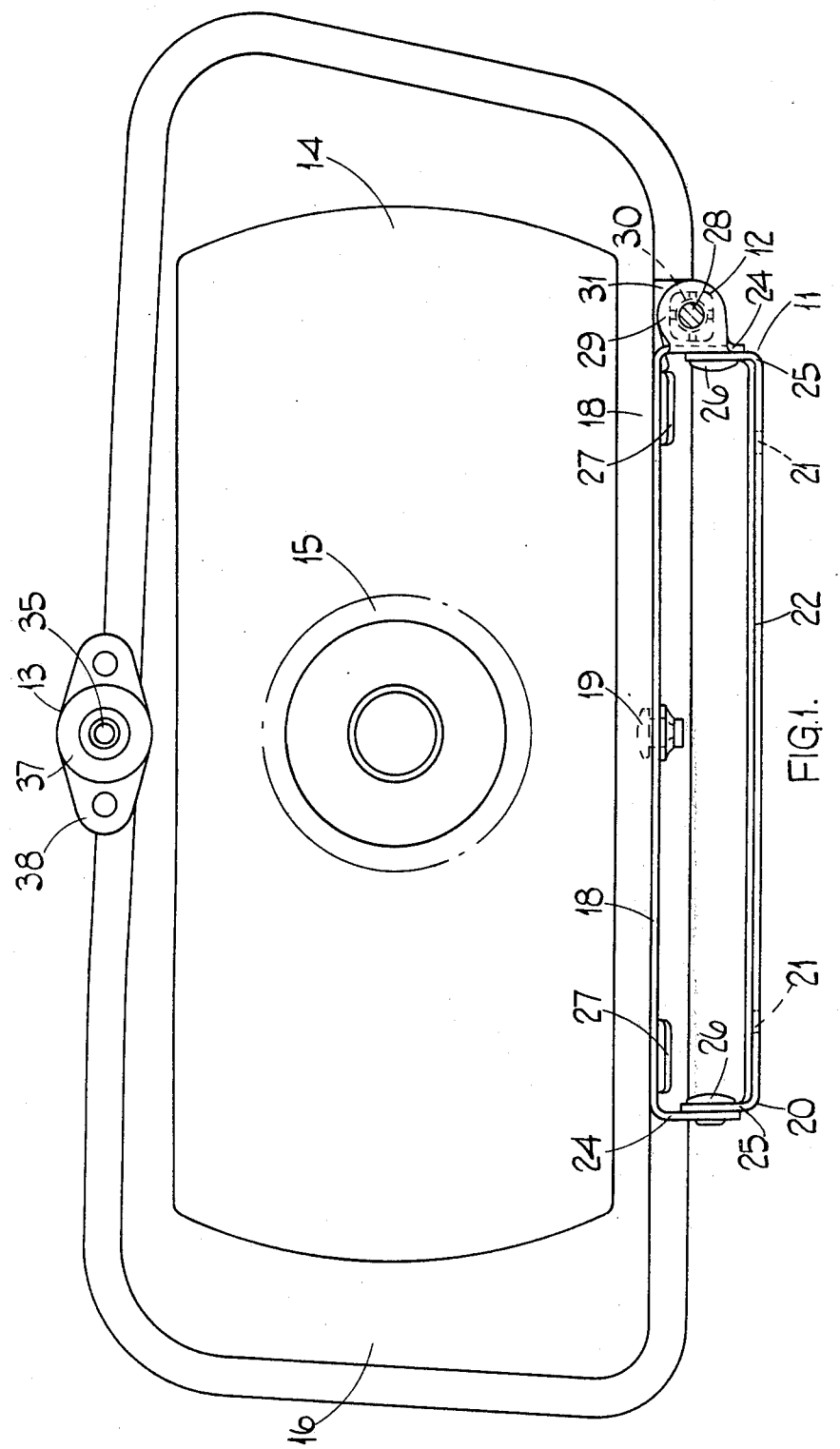

United States Patent [19]
Baker

[11] 3,932,837
[45] Jan. 13, 1976

[54] VEHICLE LAMP ASSEMBLY

[75] Inventor: Alfred Dickens Baker, Solihull, England

[73] Assignee: Lucas Electrical Company Limited, Birmingham, England

[22] Filed: Dec. 18, 1974

[21] Appl. No.: 533,786

[30] Foreign Application Priority Data
Jan. 29, 1974  United Kingdom............... 3977/74

[52] U.S. Cl............. 240/41.6; 240/7.1 R; 240/61.6
[51] Int. Cl.² ........................................ F21V 7/00
[58] Field of Search ............ 240/41.6, 7.1 R, 41 R, 240/57, 61.6

[56] References Cited
UNITED STATES PATENTS

| | | | |
|---|---|---|---|
| 2,707,748 | 5/1955 | Kocian............................ | 240/41.6 X |
| 3,229,082 | 1/1966 | Barron............................ | 240/41.6 X |
| 3,686,497 | 8/1972 | DiSalvo et al. ................ | 240/61.6 X |
| 3,823,314 | 7/1974 | Germany........................ | 240/7.1 R |
| 3,870,876 | 3/1975 | Puyplat.......................... | 240/41.6 X |
| 3,878,389 | 4/1975 | Puyplat.......................... | 240/41.6 X |

FOREIGN PATENTS OR APPLICATIONS
92,295  9/1968  France............................ 240/41.6

*Primary Examiner*—Richard L. Moses
*Attorney, Agent, or Firm*—Holman & Stern

[57] ABSTRACT

A vehicle lamp assembly, particularly a headlamp assembly has a body including a reflector, a bulbholder and a lens. The body is mounted on the vehicle by means of a first bracket portion which is attached to the body by means of a vertical pivot and a second bracket portion which is intended to be secured to the vehicle and which is pivotally attached to the first bracket portion by means of two pivots lying on a horizontal axis. A first adjusting screw acting between the body and the first bracket portion serves to effect movement of the body relative to the first bracket portion about the vertical pivot and a second adjusting screw acting between the vehicle and the body serves to effect relative pivotal movement between the bracket portions about the horizontal axis.

6 Claims, 2 Drawing Figures

VEHICLE LAMP ASSEMBLY

This invention relates to a vehicle lamp assembly and is more particularly, though not exclusively, concerned with a vehicle headlamp assembly.

It is an object of the present invention to provide an improved vehicle lamp assembly which is relatively easy to manufacture and install on a vehicle.

According to the present invention, there is provided a vehicle lamp assembly comprising a body, a mounting bracket including a first portion which is attached to the body for relative pivotal movement about a first axis and a second portion which is adapted to be mounted on a vehicle, the first and second bracket portions being connected together for relative pivotal movement about a second axis which is substantially perpendicular to the first axis, first adjusting means connected between the first bracket portion and the body for effecting relative pivotal movement about said first axis, and second adjusting means for effecting relative pivotal movement between the first and second bracket portions about said second axis.

Most preferably, each bracket portion comprises an intermediate portion and a pair of upstanding ends, each end of one of the bracket portions being attached to an adjacent end of the other bracket portion by means of a pivot, the two pivots lying on said second axis.

Conveniently, guide means are provided on the body for guiding movement of the first bracket portion relative to the body.

Advantageously, the first adjusting means comprises a first adjusting screw mounted for relative rotation but against axial movement on one of the body and the first bracket portion and engaging a screw-threaded formation on the other of the body and the first bracket portion.

Conveniently, the screw-threaded formation is provided in a bush mounted in a flange secured to the body adjacent the first bracket portion.

The second adjusting means may comprise a second adjusting screw pivotally mounted on the body for movement about a third axis parallel to the second axis, and an internally screw-threaded member mounted on the second adjusting screw, said internally screw threaded member being adapted to abut against a portion of the vehicle, in use.

Figure 2:
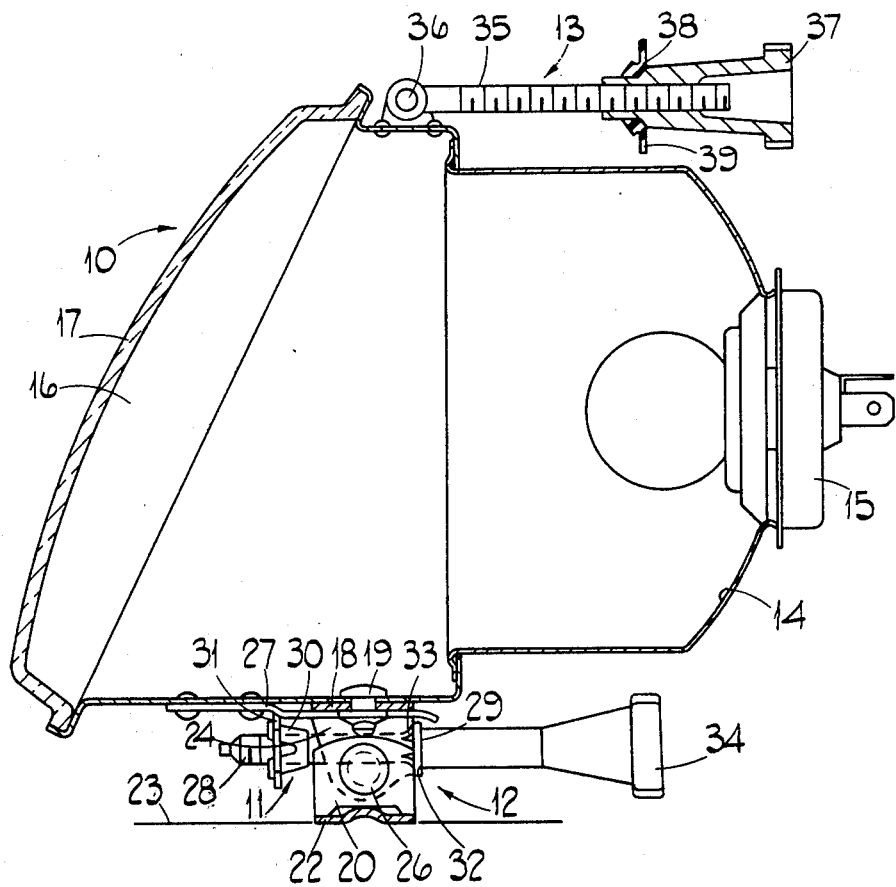

An embodiment of the present invention will now be described, by way of example, with reference to the accompanying drawings in which:

FIG. 1 is a rear view of a vehicle headlamp assembly according to the present invention, and FIG. 2 is a longitudinal sectional view of the lamp assembly of FIG. 1.

Referring to the drawings, the vehicle headlamp assembly comprises generally a body 10, a mounting bracket 11, and first and second screw adjusting devices 12 and 13 respectively.

The body 10 comprises a reflector 14 having a bulb holder 15 attached thereto, a sleeve 16 on one end of which the reflector 14 is mounted, and a lens element 17 overlying the sleeve 16 at the opposite end thereof to the reflector 14.

The mounting bracket 11 comprises a first bracket portion 18 which extends transversely of the body 10 and which is pivotally attached thereto by means of a first pivot 19. The mounting bracket 11 also comprises a second bracket portion 20 which is provided with apertures 21 in an intermediate portion 22 thereof to enable the second bracket portion 20 to be secured by screws (not shown) on a vehicle body part 23. The first bracket portion 18 has longitudinally opposed, upstanding ends 24 which are connected with corresponding, upstanding ends 25 on the second bracket portion 20 by means of a pair of second pivots 26. The second pivots 26 both lie on an axis which is perpendicular to that of the first pivot 19. Movement of the lamp body 10 relative to the first bracket portion 18 by pivoting about the axis of the first pivot 19 causes the body to move about a vertical axis, there being a pair of laterally spaced guide plates 27 riveted to the sleeve 16 of body 10 which guide the body 10 in its pivotal movement.

The first screw adjusting device 12 comprises a first adjusting screw 28 which is engaged with a plate 29 fixed to one end 24 of the first bracket portion 18. The first adjusting screw 28 engages with an internally screw threaded bush 30 which is press fitted into a plate 31 secured to the sleeve 16. The first adjusting screw 28 is engaged with the plate 29 in such a manner that rotation thereof relative to the plate is permitted but axial movement is prevented. This is effected by providing a shoulder 32 on the adjusting screw against which one side of the plate 29 abuts. Abutting against the opposite side of the plate 29 to the shoulder 32 is a plurality of slightly resilient tines 33. The adjusting screw 28 is engaged with the plate 29 by passing the former through an aperture in the plate 29 until the shoulder 32 abuts against the plate 29. During this operation, the tines 33 have been compressed radially inwardly in order to pass through the aperture and have then sprung apart on the opposite side of the plate 29 to the shoulder 32 to hold the adjusting screw 28 in position. Rotation of a knob 34 on adjusting screw 28 causes the bush 30 to move therealong. This alters the distance between bush 30 and plate 29 and causes the body 10 to pivot about the first pivot 19 relative to the first bracket portion 18. As can be seen from the drawings, the first screw adjusting device 12 is mounted, together with the mounting bracket 11 on the underside of the lamp assembly.

On the upper side of the lamp assembly, the second screw adjusting device 13 is provided. This device 13 comprises a second adjusting screw 35 which is attached to the sleeve 16 of the body 10 by means of a third pivot 36 whose axis is parallel to the axis on which lie the second pivots 26. At the opposite end of the second adjusting screw 35 to the third pivot 36, there is provided an internally screw threaded adjusting knob 37 which has an abutment portion 38 engaged with a portion 39 of the vehicle which is fixed relative to vehicle body part 23. It will be manifest that rotation of knob 37 causes it to be advanced along the second adjusting screw 35. Since the shoulder 38 on the knob 37 is engaged with body part 39, the third pivot 36 is moved either towards or away from the part 39 depending upon the direction of rotation of the knob 37. Such a movement of the third pivot 36, is, of course, accompanied by movement of the body 10 and first bracket portion 18 relative to the second bracket portion 20, such movement being effected about the axis of second pivot 26. Thus, adjustment of the body 10 about a horizontal axis is effected by rotation of knob 37 and about a vertical axis by rotation of knob 34.

The present invention provides a convenient arrangement for mounting a lamp body adjustably on a motor vehicle and enables the usual headlamp nacelle, intermediate adjusting and mounting plate and rim to be dispensed with.

I claim:

1. A vehicle lamp assembly comprising a body, a mounting bracket including a first portion which is attached to the body for relative pivotal movement about a first axis and a second portion which is adapted to be mounted on a vehicle, the first and second bracket portions being connected together for relative pivotal movement about a second axis which is substantially perpendicular to the first axis, first adjusting means connected between the first bracket portion and the body for effecting relative pivotal movement about said first axis, and second adjusting means for effecting relative pivotal movement between the first and second bracket portions about said second axis.

2. An assembly as claimed in claim 1, wherein each bracket portion comprises an intermediate portion and a pair of upstanding ends, each end of one of the bracket portions being attached to an adjacent end of the other bracket portion by means of a pivot, the two pivots lying on said second axis.

3. An assembly as claimed in claim 1, wherein guide means are provided on the body for guiding movement of the first bracket portion relative to the body.

4. An assembly as claimed in claim 1, wherein the first adjusting means comprises a first adjusting screw mounted for relative rotation but against axial movement on one of the body and the first bracket portion and engaging a screw threaded formation on the other of the body and the first bracket portion.

5. An assembly as claimed in claim 4, wherein the screw threaded formation is provided in a bush mounted in a flange secured to the body adjacent the first bracket portion.

6. As assembly as claimed in claim 1, wherein the second adjusting means comprises a second adjusting screw pivotally mounted on the body for movement about a third axis parallel to the second axis, and an internally screw threaded member mounted on the second adjusting screw, said internally screw threaded member being adapted to abut against a portion of the vehicle, in use.

* * * * *